United States Patent
Lee et al.

(10) Patent No.: US 10,780,926 B2
(45) Date of Patent: Sep. 22, 2020

(54) REINFORCING UNIT AND SIDE REINFORCING STRUCTURE OF VEHICLE INCLUDING THE SAME

(71) Applicants: Hyundai Motor Company, Seoul (KR); Kia Motors Corporation, Seoul (KR); SUNG WOO HITECH CO., LTD., Busan (KR)

(72) Inventors: Byung Ok Lee, Yongin-si (KR); Jong Hyun Ryu, Yongin-si (KR); Geun Hyuk You, Hwaseong-si (KR); Tae Hwan Kim, Yangsan-si (KR); Min Gwan Bae, Busan (KR)

(73) Assignees: Hyundai Motor Company, Seoul (KR); Kia Motors Corporation, Seoul (KR); SUNG WOO HITECH CO., LTD., Busan (KR)

( * ) Notice: Subject to any disclaimer, the term of this patent is extended or adjusted under 35 U.S.C. 154(b) by 0 days.

(21) Appl. No.: 16/284,201

(22) Filed: Feb. 25, 2019

(65) Prior Publication Data

US 2020/0114972 A1    Apr. 16, 2020

(30) Foreign Application Priority Data

Oct. 12, 2018  (KR) .................. 10-2018-0121600

(51) Int. Cl.
```
B62D 25/02   (2006.01)
B62D 25/20   (2006.01)
B60K 1/04    (2019.01)
```

(52) U.S. Cl.
CPC ....... B62D 25/025 (2013.01); B62D 25/2036 (2013.01); *B60K 2001/0438* (2013.01)

(58) Field of Classification Search
CPC .................. B62D 25/025; B62D 25/2036
USPC ............................. 296/209, 187.12
See application file for complete search history.

(56) References Cited

U.S. PATENT DOCUMENTS

| | | | |
|---|---|---|---|
| 8,696,051 B2 * | 4/2014 | Charbonneau | B62D 21/157 296/187.12 |
| 10,137,935 B2 * | 11/2018 | Koch | B62D 25/025 |
| 2012/0119546 A1 * | 5/2012 | Honda | B62D 25/025 296/203.01 |
| 2018/0134320 A1 | 5/2018 | Jeong | |

FOREIGN PATENT DOCUMENTS

KR           101896336 B1    9/2018

* cited by examiner

*Primary Examiner* — Joseph D. Pape
(74) *Attorney, Agent, or Firm* — Slater Matsil, LLP

(57) ABSTRACT

A reinforcing unit is configured to be inserted into a side sill of a vehicle body. The reinforcing unit includes a center core formed so as to extend in a longitudinal direction of the vehicle body, and a pair of cover cores formed so as to extend in the longitudinal direction of the vehicle body and arranged so as to cover an upper portion and a lower portion of the center core.

20 Claims, 7 Drawing Sheets

[FIG. 1]
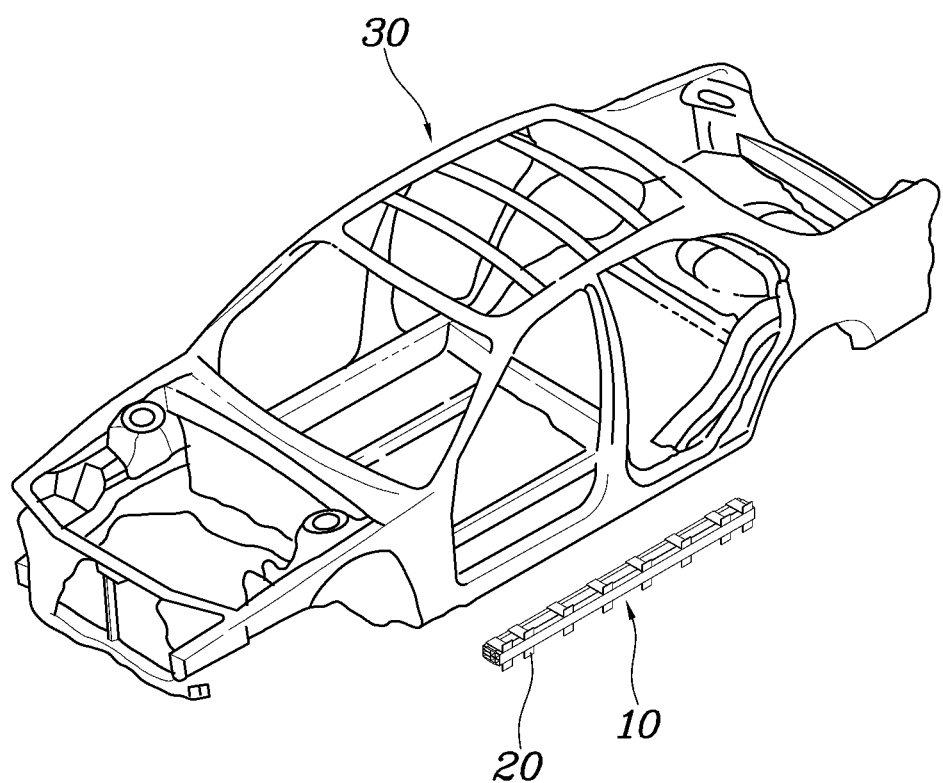

[FIG. 2]
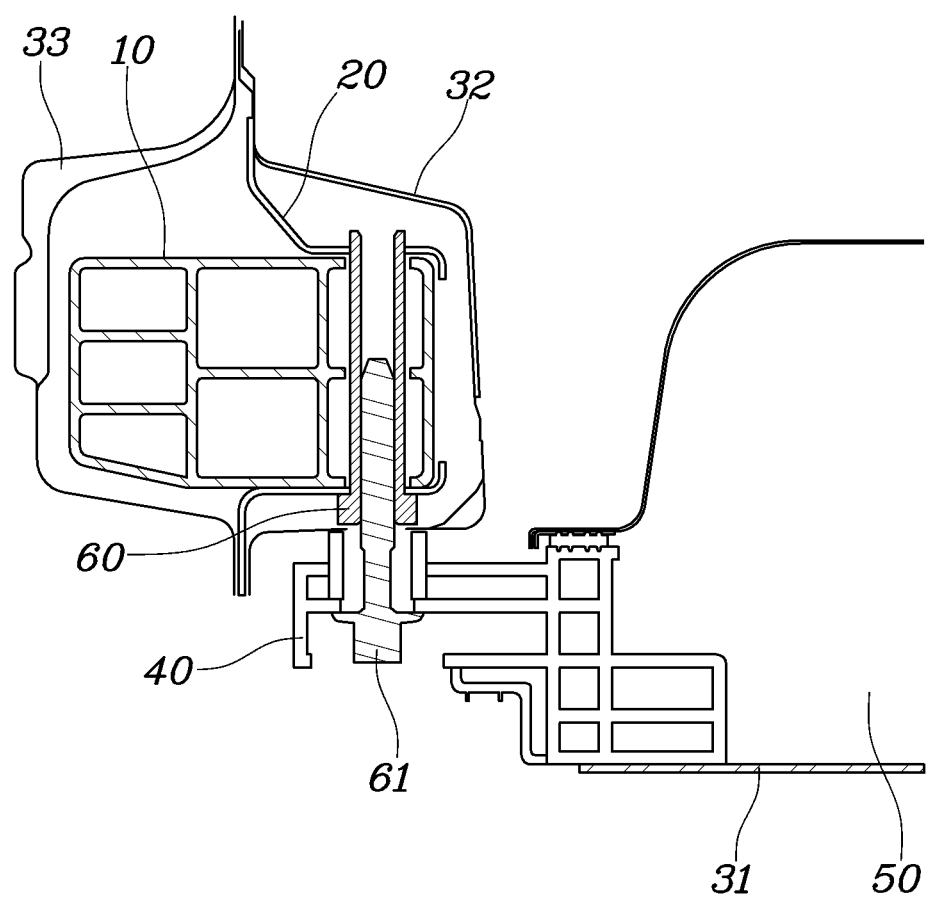

[FIG. 3]
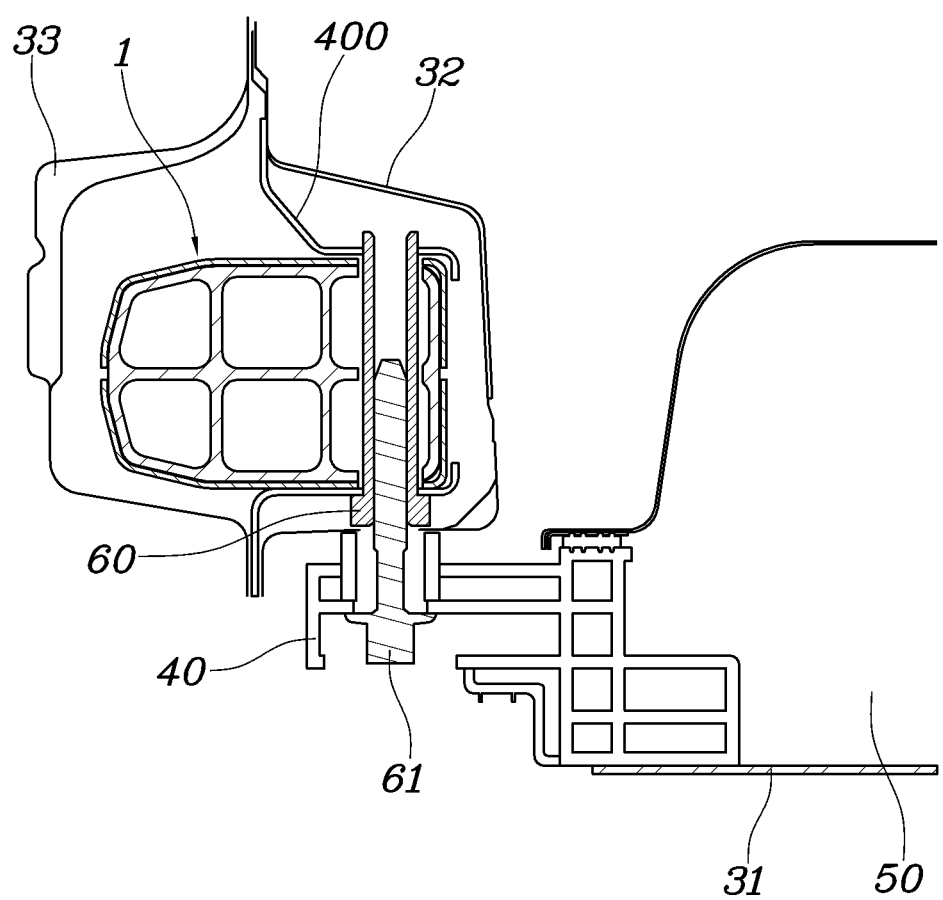

[FIG. 4]
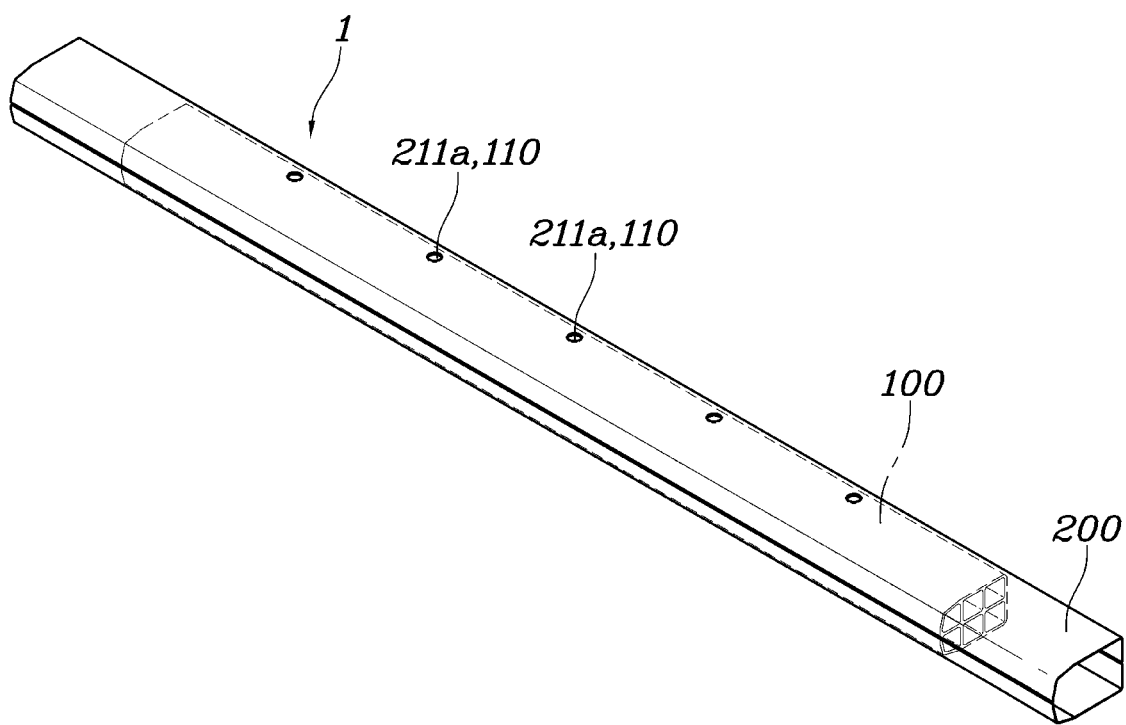

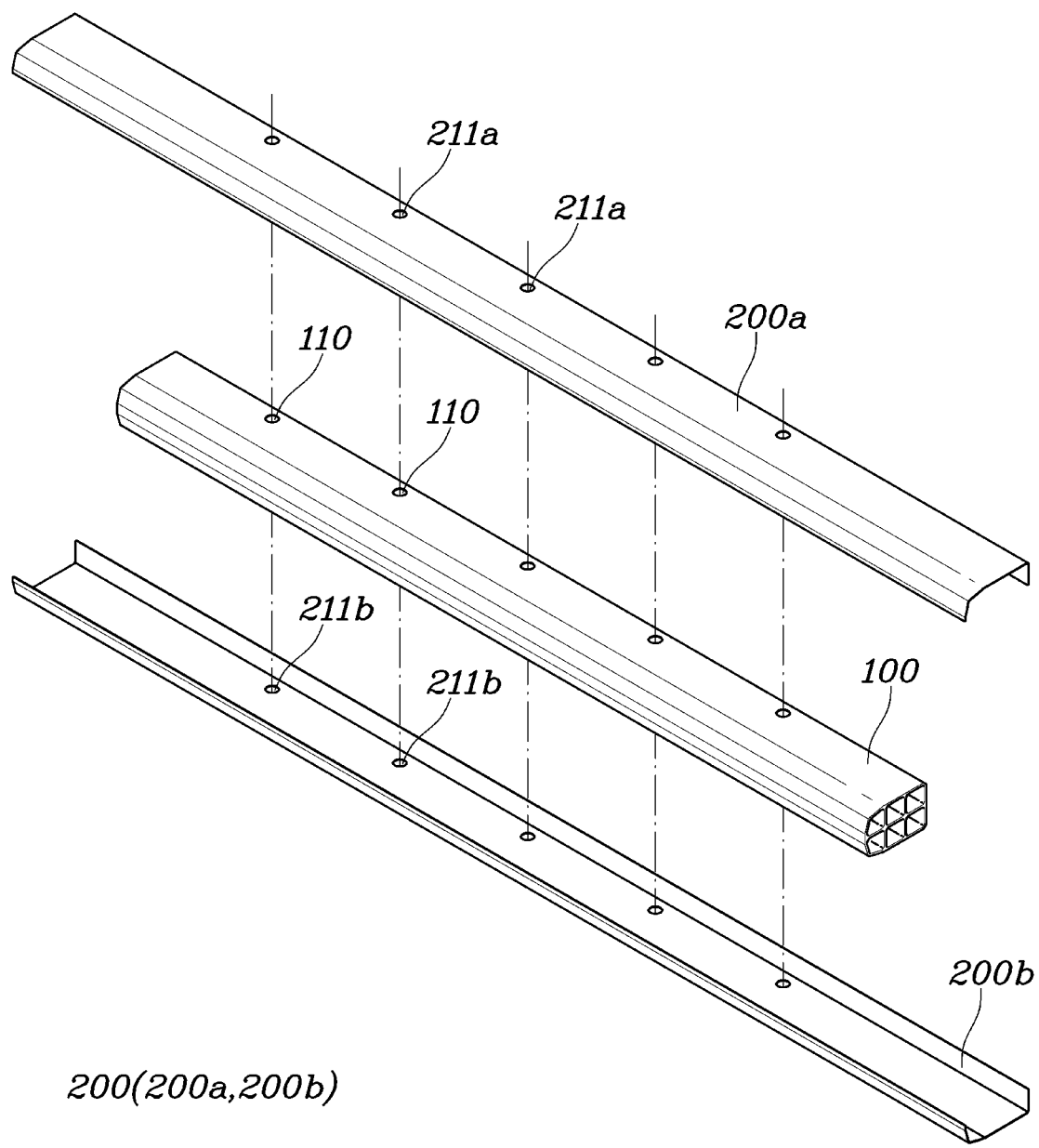

[FIG. 6]
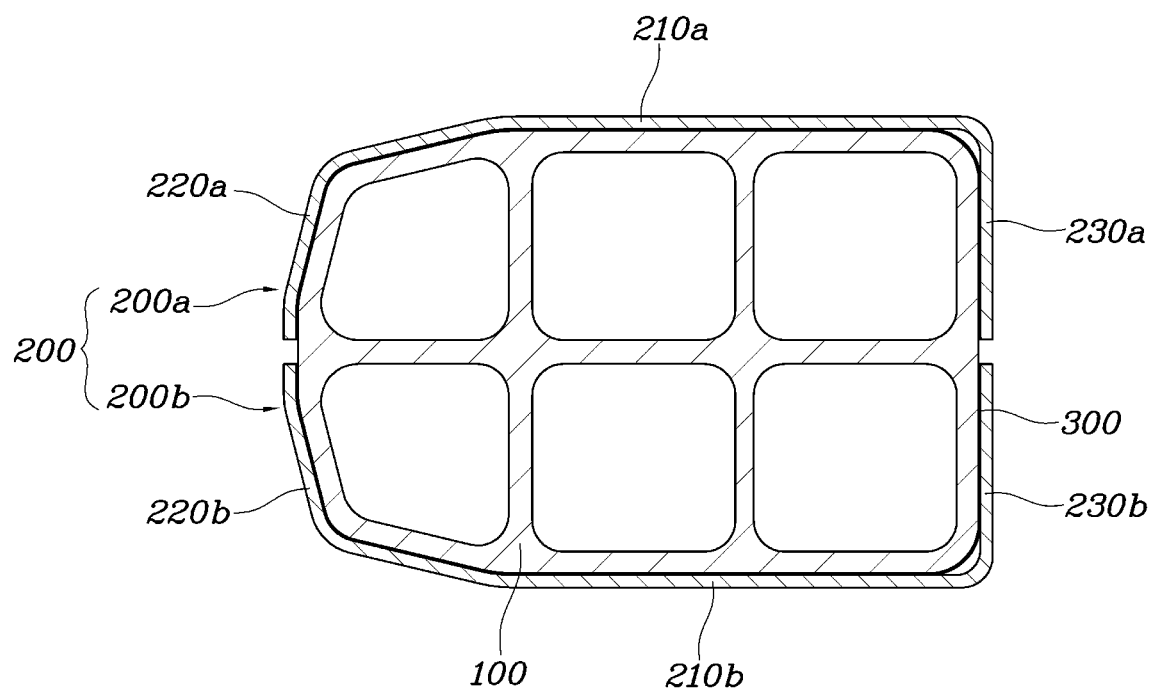

[FIG. 7]
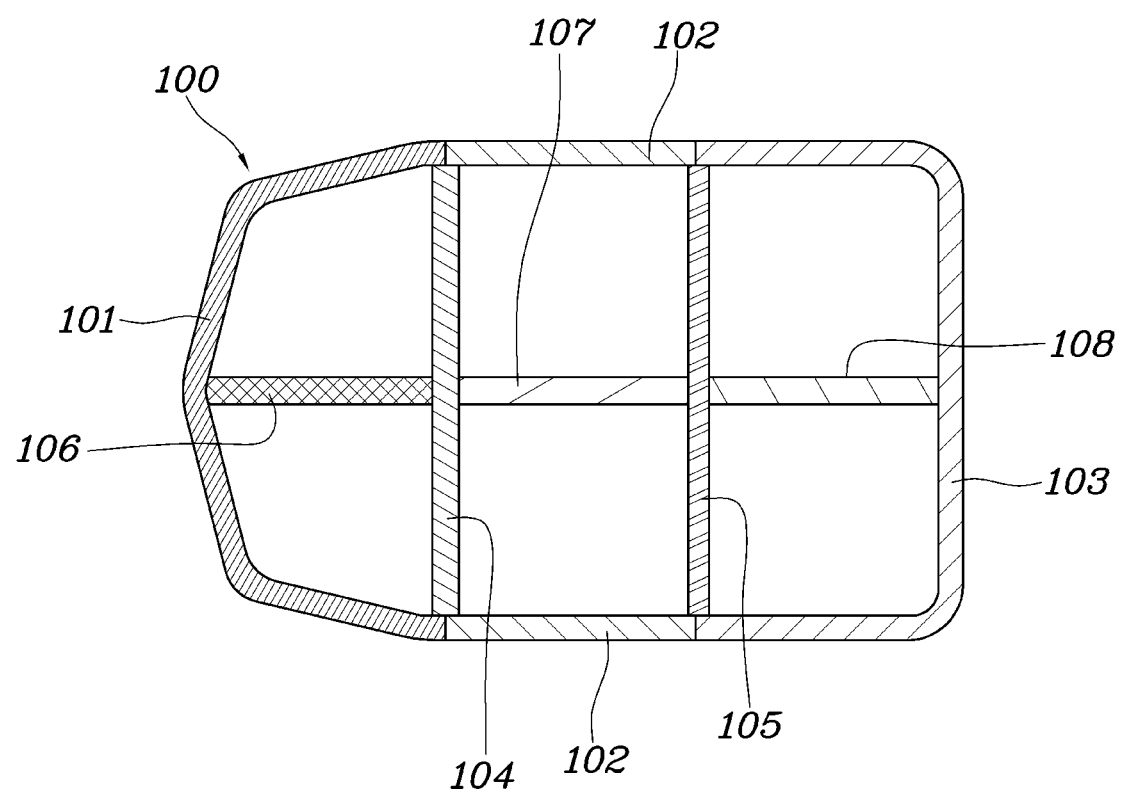

REINFORCING UNIT AND SIDE REINFORCING STRUCTURE OF VEHICLE INCLUDING THE SAME

CROSS-REFERENCE TO RELATED APPLICATIONS

This application claims priority to Korean Patent Application No. 10-2018-0121600, filed in the Korean Intellectual Property Office on Oct. 12, 2018, which application is hereby incorporated herein by reference.

TECHNICAL FIELD

The present invention relates to a reinforcing unit and a side reinforcing structure of a vehicle including the same.

BACKGROUND

In general, a vehicle is provided with a side sill, which is formed at each side portion of a vehicle body so as to extend in a longitudinal direction of the vehicle in order to improve crashworthiness in the event of a side collision. This side sill is an important vehicle body structure for withstanding a head-on or side collision of the vehicle, and is conventionally manufactured using a steel sheet.

An electric vehicle is a vehicle that is driven by the operation of an electric motor that receives energy from a battery. The electric vehicle includes a high-voltage battery mounted on a vehicle body floor. In order to increase the traveling distance of the electric vehicle, the capacity of a battery needs to be increased. However, because the size of the vehicle body is limited, the capacity of the battery cannot be increased without limitation. Thus, the electric vehicle is designed so as to minimize the distance between a battery and a side sill constituting the vehicle body in order to maximize the capacity of the battery.

However, due to the minimized distance between the battery and the side sill, if the rigidity of the side sill is insufficient, the side sill may be easily damaged or deformed by external shocks, resulting in damage to the battery.

Therefore, in order to protect occupants and the battery in the event of a side collision, it is required to maintain the rigidity of the side sill at a high level while minimizing a change in the vehicle body structure.

Recently, technology has been developed to fix a reinforcing core, which is formed by extruding aluminum in a tubular shape, inside the side sill in order to ensure a certain level of strength while realizing a reduction in weight in comparison with a steel sheet.

FIG. 1 is a view showing a vehicle body to which a conventional reinforcing core is applied, and FIG. 2 is a view showing an example in which a conventional reinforcing core is applied to a vehicle body.

As shown in FIG. 1, a reinforcing core 10 is a side-sill-reinforcing member, which is formed by extruding aluminum in a tubular shape. The reinforcing core 10 is inserted into a side sill, which is provided at each side portion of a vehicle body 30 in the longitudinal direction of the vehicle, and is supported by a bracket 20.

In greater detail, as shown in FIG. 2, a side sill, which includes an inner side sill panel 32 and an outer side sill panel 33, is provided at each of both sides of a floor panel 31 constituting the vehicle body 30. A battery case 40, to which a battery 50 is secured, is mounted on the floor panel 31. The reinforcing core 10, which is disposed in the side sill, is secured to the side sill by the bracket 20, and is mounted to the battery case 40. The reinforcing core 10 is mounted to the battery case 40 via a mounting member 60, such as a pipe nut, and a bolt 61.

Although the reinforcing core formed through extrusion of aluminum is lighter than a steel material used in the related art, there still exists a demand for a reduction in weight and improvement of strength of the reinforcing core.

The information disclosed in this Background of the Invention section is only for enhancement of understanding of the general background of the invention and should not be taken as an acknowledgement or any form of suggestion that this information forms the prior art already known to a person skilled in the art.

SUMMARY

The present invention relates to a reinforcing unit and a side reinforcing structure of a vehicle including the same. Particular embodiments relate to a reinforcing unit, which is capable of maintaining a high level of rigidity to withstand a side collision while reducing the weight of a vehicle, and a side reinforcing structure of a vehicle including the same.

Embodiments of the present invention can solve problems noted above. Embodiments of the present invention provide a reinforcing unit, which is capable of maintaining strength at a level equivalent to the strength of a conventional reinforcing core formed through extrusion of aluminum while realizing a reduction in weight.

In accordance with an aspect of the present invention, a reinforcing unit can be configured to be inserted into a side sill of a vehicle body. The reinforcing unit includes a center core formed so as to extend in the longitudinal direction of the vehicle body and a pair of cover cores formed so as to extend in the longitudinal direction of the vehicle body and arranged so as to cover an upper portion and a lower portion of the center core.

The center core may be formed of thermoplastic resin, and the cover cores may be formed of fiber-reinforced plastic.

The pair of cover cores may include an upper cover core and a lower cover core, and the upper cover core and the lower cover core may be arranged so as to be symmetrical to each other with respect to an imaginary central horizontal plane of the center core.

The upper cover core may include an upper base cover portion formed to cover the top surface of the center core, an upper outer cover portion formed to be bent and to extend from one end of the upper base cover portion in order to cover one side surface of the center core, and an upper inner cover portion formed to be bent and to extend from the opposite end of the upper base cover portion in order to cover the opposite side surface of the center core. The upper base cover portion, the upper outer cover portion and the upper inner cover portion may be formed integrally with each other. The lower cover core may include a lower base cover portion formed to cover the bottom surface of the center core, a lower outer cover portion formed to be bent and to extend from one end of the lower base cover portion in order to cover one side surface of the center core, and a lower inner cover portion formed to be bent and to extend from the opposite end of the lower base cover portion in order to cover the opposite side surface of the center core. The lower base cover portion, the lower outer cover portion and the lower inner cover portion may be formed integrally with each other.

The upper outer cover portion and the lower outer cover portion may be curved and extend from the upper base cover portion and the lower base cover portion in the outward direction of the vehicle body, and the upper inner cover portion and the lower inner cover portion may be bent at a right angle and extend from the upper base cover portion and the lower base cover portion in the inward direction of the vehicle body.

The center core may be a hollow tubular body, the two ends of which communicate with each other in the longitudinal direction of the vehicle body, and the center core may be provided therein with at least one partition wall formed in the vertical direction or in the horizontal direction in order to partition a hollow space in the center core.

The center core may be divided into three panels in the width direction of the vehicle body, the three panels including an outer panel that corresponds to a region in the outward direction of the vehicle body, a middle panel that extends from the outer panel and corresponds to an intermediate region, and an inner panel that extends from the middle panel and corresponds to a region in the inward direction of the vehicle body. The partition wall may include an outer vertical partition wall formed vertically to connect boundary points between the outer panel and the middle panel, an inner vertical partition wall formed vertically to connect boundary points between the middle panel and the inner panel, an outer horizontal partition wall formed to partition the space defined by the outer panel and the outer vertical partition wall into an upper region and a lower region, a middle horizontal partition wall formed to partition the space defined by the outer vertical partition wall and the inner vertical partition wall into an upper region and a lower region, and an inner horizontal partition wall formed to partition the space defined by the inner vertical partition wall and the inner panel into an upper region and a lower region. The outer panel may be thicker than the middle panel and the inner panel, the outer vertical partition wall may be thicker than the inner vertical partition wall, and the outer horizontal partition wall and the middle horizontal partition wall may be thicker than the inner horizontal partition wall.

The pair of cover cores may be adhered to the center core via an adhesive layer, which is formed of an adhesive agent.

In accordance with another aspect of the present invention, there is provided a side reinforcing structure of a vehicle, the side reinforcing structure including a side sill provided at each side portion of a floor panel, on which a battery case is mounted, the side sill including an inner side sill panel and an outer side sill panel coupled to each other, and a reinforcing unit fixedly supported by a bracket inside the side sill and mounted to the battery case. The reinforcing unit includes a center core formed so as to extend in the longitudinal direction of the vehicle body, the center core being formed of thermoplastic resin, and a pair of cover cores formed so as to extend in the longitudinal direction of the vehicle body and arranged so as to cover an upper portion and a lower portion of the center core, the pair of cover cores being formed of fiber-reinforced plastic.

The side reinforcing structure may further include a mounting member fixedly inserted through the reinforcing unit in the vertical direction. The reinforcing unit may be mounted to the battery case such that the mounting member is coupled to the battery case via a bolt.

The pair of cover cores may include an upper cover core and a lower cover core. The center core of the reinforcing unit may include at least one first coupling hole formed therethrough in the vertical direction. The upper cover core may include a second coupling hole formed therethrough so as to communicate with the first coupling hole, and the lower cover core may include a third coupling hole formed therethrough so as to communicate with the first coupling hole and the second coupling hole. The mounting member may be secured to the reinforcing unit while penetrating the first coupling hole, the second coupling hole and the third coupling hole.

The reinforcing unit may be formed such that the center core is shorter than the pair of cover cores.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a view showing a vehicle body to which a conventional reinforcing core is applied;

FIG. 2 is a view showing an example in which a conventional reinforcing core is applied to a vehicle body;

FIG. 3 is a view showing a side reinforcing structure of a vehicle according to an embodiment of the present invention;

FIG. 4 is a perspective view showing a reinforcing unit according to an embodiment of the present invention;

FIG. 5 is an exploded perspective view showing the reinforcing unit according to the embodiment of the present invention;

FIG. 6 is a cross-sectional view showing the reinforcing unit according to the embodiment of the present invention; and FIG. 7 is a cross-sectional view showing a center core according to an embodiment of the present invention.

DETAILED DESCRIPTION OF ILLUSTRATIVE EMBODIMENTS

Reference will now be made in detail to the preferred embodiments of the present invention, examples of which are illustrated in the accompanying drawings. The present invention may, however, be embodied in many different forms, and should not be construed as being limited to the embodiments set forth herein. Rather, these embodiments are provided so that this disclosure will be thorough and complete, and will fully convey the scope of the invention to those skilled in the art. Wherever possible, the same reference numbers will be used throughout the drawings to refer to the same or like parts.

FIG. 3 is a view showing a side reinforcing structure of a vehicle according to an embodiment of the present invention, FIG. 4 is a perspective view showing a reinforcing unit according to an embodiment of the present invention, FIG. 5 is an exploded perspective view showing the reinforcing unit according to the embodiment of the present invention, FIG. 6 is a cross-sectional view showing the reinforcing unit according to the embodiment of the present invention, and FIG. 7 is a cross-sectional view showing a center core according to an embodiment of the present invention.

As shown in the drawings, a side reinforcing structure of a vehicle according to an embodiment of the present invention includes a side sill 32 and 33, which constitutes a vehicle body, and a reinforcing unit 1 inserted into the side sill 32 and 33.

The side sill 32 and 33 is provided at each side portion of a floor panel 31, on which a battery case 40 is mounted, and includes an inner side sill panel 32 and an outer side sill panel 33, which are coupled to each other.

The reinforcing unit 1 is fixedly supported by a bracket 400 inside the side sill 32 and 33, and is mounted to the battery case 40, thereby reinforcing the rigidity of the side sill 32 and 33.

The reinforcing unit 1 includes a center core 100 and a pair of cover cores 200 arranged so as to cover the upper portion and the lower portion of the center core 100.

The center core 100 is a member that is formed through extrusion or injection molding using resin so as to extend in the longitudinal direction of the vehicle body. The center core 100 may be manufactured through extrusion molding so as to have the shape of a hollow tubular body, the two ends of which communicate with each other in the longitudinal direction of the vehicle body. Thus, the cross-sectional shape of the center core 100 may be uniform in the longitudinal direction of the vehicle body.

Thermoplastic resin may be used to form the center core 100 in order to realize a reduction in weight and provide excellent formability. For example, the center core 100 may be formed by extruding PA6, which is thermoplastic resin. PA6 is thermoplastic resin containing caprolactam as a main component and having excellent mechanical, thermal and electrical properties. Of course, the material of the center core 100 is not limited to the thermoplastic resin disclosed herein, but various other kinds of resin materials may be used in order to achieve reduced weight and improved formability.

The center core 100 is provided therein with at least one partition wall, which is formed in a vertical direction or in a horizontal direction in order to partition the hollow space in the center core 100. This configuration ensures a desired level of rigidity of the center core 100 while reducing the weight of the center core 100.

In order to ensure the highest level of rigidity of the center core 100 while realizing a reduction in the weight thereof, panels and partition walls, which partition the hollow space in the center core 100 into a plurality of sections, may be formed so as to have different thicknesses from each other.

For example, as shown in FIG. 7, the center core 100, which is of a tubular type, is divided into three panels in the width direction of the vehicle body, namely an outer panel 101, which corresponds to a region in an outward direction of the vehicle body, a middle panel 102, which extends from the outer panel 101 and corresponds to an intermediate region, and an inner panel 103, which extends from the middle panel 102 and corresponds to a region in an inward direction of the vehicle body.

The partition walls, which partition the internal space in the center core 100, include an outer vertical partition wall 104, which is formed vertically to connect boundary points between the outer panel 101 and the middle panel 102, an inner vertical partition wall 105, which is formed vertically to connect boundary points between the middle panel 102 and the inner panel 103, an outer horizontal partition wall 106, which is formed to partition the space defined by the outer panel 101 and the outer vertical partition wall 104 into an upper region and a lower region, a middle horizontal partition wall 107, which is formed to partition the space defined by the outer vertical partition wall 104 and the inner vertical partition wall 105 into an upper region and a lower region, and an inner horizontal partition wall 108, which is formed to partition the space defined by the inner vertical partition wall 105 and the inner panel 103 into an upper region and a lower region.

In order to enhance the rigidity to withstand a side impact, the outer panel 101 may be formed so as to have a larger thickness than the middle panel 102 and the inner panel 103, the outer vertical partition wall 104 may be formed so as to have a larger thickness than the inner vertical partition wall 105, and each of the outer horizontal partition wall 106 and the middle horizontal partition wall 107 may be formed so as to have a larger thickness than the inner horizontal partition wall 108.

The thickness of the outer panel 101 may be set to 3.4 mm, and the thickness of each of the middle panel 102 and the inner panel 103 may be set to 3.0 mm. The thickness of the outer vertical partition wall 104 may be set to 3.6 mm, and the thickness of the inner vertical partition wall 105 may be set to 3.0 mm. The thickness of each of the outer horizontal partition wall 106 and the middle horizontal partition wall 107 may be set to 4.5 mm, and the thickness of the inner horizontal partition wall 108 may be set to 3.0 mm.

In addition, in order to enhance the rigidity to withstand a side impact, the outer panel 101 is formed so as to be curved in a substantially arc shape in cross section, and the inner panel 103 is formed so as be bent at a substantially right angle in a substantially "[" shape in cross section.

The center core 100 has at least one first coupling hole no formed therethrough in the vertical direction. The mounting member 60, which is provided to mount the reinforcing unit 1 to the battery case 40, is fixedly inserted through the first coupling hole 110.

The pair of cover cores 200 covers the upper portion and the lower portion of the center core 100 in order to maintain the rigidity of the reinforcing unit 1 at a desired level. The cover cores 200 may be formed through extrusion molding in a shape that is elongated in the longitudinal direction of the vehicle body so as to cover the upper and lower portions of the center core 100. Thus, like the center core 100, the cross-sectional shape of each of the pair of cover cores 200 may be uniform in the longitudinal direction of the vehicle body.

The cover cores 200 may be manufactured using fiber-reinforced plastic in order to realize a reduction in weight and maintain a desired level of rigidity. For example, the cover cores 200 may be formed through extrusion molding using carbon-fiber-reinforced plastic (CFRP), in which a carbon fiber is used as a reinforcing material. Of course, the material of the cover cores 200 is not limited to the CFRP disclosed herein, but fiber-reinforced plastic containing various other kinds of reinforcing materials may be used for a reduction in weight and maintenance of rigidity.

The pair of cover cores 200 may include an upper cover core 200a and a lower cover core 200b. The upper cover core 200a and the lower cover core 200b are formed and arranged so as to be symmetrical to each other with respect to an imaginary central horizontal plane of the center core 100.

The upper cover core 200a and the lower cover core 200b are respectively formed so as to have a substantially "∩" shape and a substantially "U" shape in order to cover the upper and lower portions of the center core 100.

In greater detail, as shown in FIGS. 5 and 6, the upper cover core 200a includes an upper base cover portion 210a, which covers the top surface of the center core 100, an upper outer cover portion 220a, which is bent and extends from one end of the upper base cover portion 210a in order to cover one side surface of the center core 100, and an upper inner cover portion 230a, which is bent and extends from the opposite end of the upper base cover portion 210a in order to cover the opposite side surface of the center core 100. The upper base cover portion 210a, the upper outer cover portion 220a and the upper inner cover portion 230a are formed integrally with each other.

The lower cover core 200b includes a lower base cover portion 210b, which covers the bottom surface of the center core 100, a lower outer cover portion 220b, which is bent and extends from one end of the lower base cover portion 210b in order to cover one side surface of the center core 100, and a lower inner cover portion 230b, which is bent and extends from the opposite end of the lower base cover portion 210b in order to cover the opposite side surface of the center core 100. The lower base cover portion 210b, the lower outer cover portion 220b and the lower inner cover portion 230b are formed integrally with each other.

The upper cover core 200a and the lower cover core 200b are formed so as to have a shape corresponding to the shape of the outer surface of the center core 100 in order to enhance the rigidity to withstand a side impact.

In greater detail, the upper outer cover portion 220a and the lower outer cover portion 220b are curved and extend from the upper base cover portion 210a and the lower base cover portion 210b in the outward direction of the vehicle body. The upper inner cover portion 230a and the lower inner cover portion 230b are bent at a substantially right angle and extend from the upper base cover portion 210a and the lower base cover portion 210b in the inward direction of the vehicle body.

Each of the upper cover core 200a and the lower cover core 200b has a coupling hole formed therethrough so as to communicate with the first coupling hole 110. The mounting member 60 is fixedly inserted through the coupling hole in order to mount the reinforcing unit 1 to the battery case 40. For example, the upper cover core 200a has a second coupling hole 211a formed therethrough so as to communicate with the first coupling hole 110, and the lower cover core 200b has a third coupling hole 211b formed therethrough so as to communicate with the first coupling hole 110 and the second coupling hole 211a.

Therefore, the mounting member 60 is secured to the reinforcing unit 1 while penetrating the first coupling hole 110, the second coupling hole 211a and the third coupling hole 211b. Here, the mounting member 60 may be implemented as a pipe nut.

Therefore, the reinforcing unit 1 is mounted to the battery case 40 in a manner such that the mounting member 60 is coupled to the battery case 40 by fastening a bolt 61 into the mounting member 60.

The pair of cover cores 200, i.e., the upper cover core 200a and the lower cover core 200b, are fixedly adhered to the center core 100 via an adhesive layer 300, which is formed of an adhesive agent.

In addition, in order to reduce the weight of the reinforcing unit 1, the center core 100 may be formed so as to be shorter than the pair of cover cores 200, i.e. the upper cover core 200a and the lower cover core 200b.

Thus, the upper cover core 200a and the lower cover core 200b may be formed so as to have a length corresponding to the internal length of the side sill 32 and 33, the center core 100 may be formed so as to have a length shorter than the internal length of the side sill 32 and 33 so that the center core 100 occupies the minimum area necessary to withstand a side collision, and the overall shape of the reinforcing unit 1 may be maintained by the upper cover core 200a and the lower cover core 200b.

As is apparent from the above description, according to the embodiment of the present invention, a rigidity-reinforcing unit formed of resin and fiber-reinforced plastic is inserted into a side sill, and accordingly, the side sill configured in this manner is capable of maintaining a high level of rigidity to withstand a side collision while reducing the weight of a vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reinforcing unit configured to be inserted into a side sill of a vehicle body, the reinforcing unit comprising:
    a center core formed so as to extend in a longitudinal direction of the vehicle body; and
    a pair of cover cores formed so as to extend in the longitudinal direction of the vehicle body and arranged so as to cover an upper portion and a lower portion of the center core;
    wherein the center core is a hollow tubular body, the hollow tubular body having two ends communicating with each other in the longitudinal direction of the vehicle body, and
    wherein the center core is provided therein with at least one partition wall formed in a vertical direction or in a horizontal direction in order to partition a hollow space in the center core;
    wherein the center core is divided into three panels in a width direction of the vehicle body, the three panels comprising an outer panel that corresponds to a region in an outward direction of the vehicle body, a middle panel that extends from the outer panel and corresponds to an intermediate region, and an inner panel that extends from the middle panel and corresponds to a region in an inward direction of the vehicle body; and
    wherein the partition wall comprises an outer vertical partition wall formed vertically to connect boundary points between the outer panel and the middle panel, an inner vertical Partition wall formed vertically to connect boundary points between the middle panel and the inner panel, an outer horizontal partition wall formed to partition a space defined by the outer panel and the outer vertical partition wall into an upper region and a lower region, a middle horizontal partition wall formed to partition a space defined by the outer vertical partition wall and the inner vertical partition wall into an upper region and a lower region, and an inner horizontal partition wall formed to partition a space defined by the inner vertical partition wall and the inner panel into an upper region and a lower region.

2. The reinforcing unit according to claim 1, wherein the center core is formed of thermoplastic resin, and wherein the cover cores are formed of fiber-reinforced plastic.

3. The reinforcing unit according to claim 2, wherein the thermoplastic resin contains caprolactam as a main component.

4. The reinforcing unit according to claim 1, wherein the pair of cover cores comprises an upper cover core and a lower cover core, and wherein the upper cover core and the lower cover core are arranged so as to be symmetrical to each other with respect to an imaginary central horizontal plane of the center core.

5. The reinforcing unit according to claim 4, wherein the upper cover core comprises an upper base cover portion formed to cover a top surface of the center core, an upper outer cover portion formed to be bent and to extend from one end of the upper base cover portion in order to cover one side surface of the center core, and an upper inner cover portion formed to be bent and to extend from an opposite end of the upper base cover portion in order to cover an opposite side surface of the center core, the upper base cover portion, the upper outer cover portion and the upper inner cover portion being formed integrally with each other, and wherein the lower cover core comprises a lower base cover portion formed to cover a bottom surface of the center core, a lower outer cover portion formed to be bent and to extend from one end of the lower base cover portion in order to cover one side surface of the center core, and a lower inner cover portion formed to be bent and to extend from an opposite end of the lower base cover portion in order to cover an opposite side surface of the center core, the lower base cover portion, the lower outer cover portion and the lower inner cover portion being formed integrally with each other.

6. The reinforcing unit according to claim 5, wherein the upper outer cover portion and the lower outer cover portion are curved and extend from the upper base cover portion and the lower base cover portion in an outward direction of the vehicle body, and wherein the upper inner cover portion and the lower inner cover portion are bent at a right angle and extend from the upper base cover portion and the lower base cover portion in an inward direction of the vehicle body.

7. The reinforcing unit according to claim 1, wherein the outer panel is thicker than the middle panel and the inner panel;

wherein the outer vertical partition wall is thicker than the inner vertical partition wall; and wherein the outer horizontal partition wall and the middle horizontal partition wall are thicker than the inner horizontal partition wall.

8. The reinforcing unit according to claim 1, wherein the pair of cover cores is adhered to the center core via an adhesive layer, the adhesive layer being formed of an adhesive agent.

9. A side reinforcing structure of a vehicle, the side reinforcing structure comprising:

a side sill provided at each side portion of a floor panel, on which a battery case is mounted, the side sill comprising an inner side sill panel and an outer side sill panel coupled to each other; and a reinforcing unit fixedly supported by a bracket inside the side sill and mounted to the battery case, the reinforcing unit comprising:

a center core formed so as to extend in a longitudinal direction of a vehicle body, the center core being formed of thermoplastic resin; and a pair of cover cores formed so as to extend in the longitudinal direction of the vehicle body and arranged so as to cover an upper portion and a lower portion of the center core, the pair of cover cores being formed of fiber-reinforced plastic.

10. The side reinforcing structure according to claim 9, further comprising:

a mounting member fixedly inserted through the reinforcing unit in a vertical direction, wherein the reinforcing unit is mounted to the battery case such that the mounting member is coupled to the battery case via a bolt.

11. The side reinforcing structure according to claim 10, wherein the pair of cover cores comprises an upper cover core and a lower cover core, wherein the center core of the reinforcing unit comprises at least one first coupling hole formed therethrough in the vertical direction, wherein the upper cover core comprises a second coupling hole formed therethrough so as to communicate with the first coupling hole, wherein the lower cover core comprises a third coupling hole formed therethrough so as to communicate with the first coupling hole and the second coupling hole, and wherein the mounting member is secured to the reinforcing unit while penetrating the first coupling hole, the second coupling hole and the third coupling hole.

12. The side reinforcing structure according to claim 9, wherein the reinforcing unit is formed such that the center core is shorter than the pair of cover cores.

13. A vehicle comprising:

a vehicle body;

a floor panel within the vehicle body;

a side sill provided at each side portion of the floor panel, the side sill comprising an inner side sill panel and an outer side sill panel coupled to each other;

a battery case mounted on the side sill; and a reinforcing unit fixedly supported by a bracket inside the side sill and mounted to the battery case, the reinforcing unit comprising:

a center core formed so as to extend in a longitudinal direction of the vehicle body, the center core being formed of thermoplastic resin; and a pair of cover cores formed so as to extend in the longitudinal direction of the vehicle body and arranged so as to cover an upper portion and a lower portion of the center core, the pair of cover cores being formed of fiber-reinforced plastic.

14. The vehicle according to claim 13, further comprising:

a mounting member fixedly inserted through the reinforcing unit in a vertical direction, wherein the reinforcing unit is mounted to the battery case such that the mounting member is coupled to the battery case via a bolt.

15. The vehicle according to claim 14, wherein the pair of cover cores comprises an upper cover core and a lower cover core, wherein the center core of the reinforcing unit comprises at least one first coupling hole formed therethrough in the vertical direction, wherein the upper cover core comprises a second coupling hole formed therethrough so as to communicate with the first coupling hole, wherein the lower cover core comprises a third coupling hole formed therethrough so as to communicate with the first coupling hole and the second coupling hole, and wherein the mounting member is secured to the reinforcing unit while penetrating the first coupling hole, the second coupling hole and the third coupling hole.

16. The vehicle according to claim 13, wherein the pair of cover cores comprises an upper cover core and a lower cover core, and wherein the upper cover core and the lower cover core are arranged so as to be symmetrical to each other with respect to an imaginary central horizontal plane of the center core.

17. The vehicle according to claim 13, wherein the center core is a hollow tubular body, the hollow tubular body having two ends communicating with each other in the longitudinal direction of the vehicle body, and wherein the center core is provided therein with at least one partition wall formed in a vertical direction or in a horizontal direction in order to partition a hollow space in the center core.

18. The side reinforcing structure according to claim 9, wherein the pair of cover cores comprises an upper cover core and a lower cover core, and wherein the upper cover core and the lower cover core are arranged so as to be symmetrical to each other with respect to an imaginary central horizontal plane of the center core.

19. The side reinforcing structure according to claim 9, wherein the center core is a hollow tubular body, the hollow tubular body having two ends communicating with each other in the longitudinal direction of the vehicle body, and wherein the center core is provided therein with at least one partition wall formed in a vertical direction or in a horizontal direction in order to partition a hollow space in the center core.

20. The side reinforcing structure according to claim 19, wherein the center core is divided into three panels in a width direction of the vehicle body, the three panels comprising an outer panel that corresponds to a region in an outward direction of the vehicle body, a middle panel that extends from the outer panel and corresponds to an intermediate region, and an inner panel that extends from the middle panel and corresponds to a region in an inward direction of the vehicle body; and wherein the partition wall comprises an outer vertical partition wall formed vertically to connect boundary points between the outer panel and the middle panel, an inner vertical partition wall formed vertically to connect boundary points between the middle panel and the inner panel, an outer horizontal partition wall formed to partition a space defined by the outer panel and the outer vertical partition wall into an upper region and a lower region, a middle horizontal partition wall formed to partition a space defined by the outer vertical partition wall and the inner vertical partition wall into an upper region and a lower region, and an inner horizontal partition wall formed to partition a space defined by the inner vertical partition wall and the inner panel into an upper region and a lower region.

\* \* \* \* \*